May 29, 1928. 1,671,944
E. E. WAITE
ENDLESS FACING AND METHOD OF MANUFACTURING SAME
Filed June 10, 1926
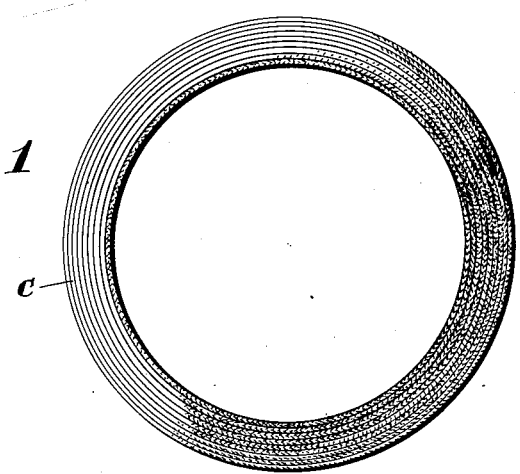
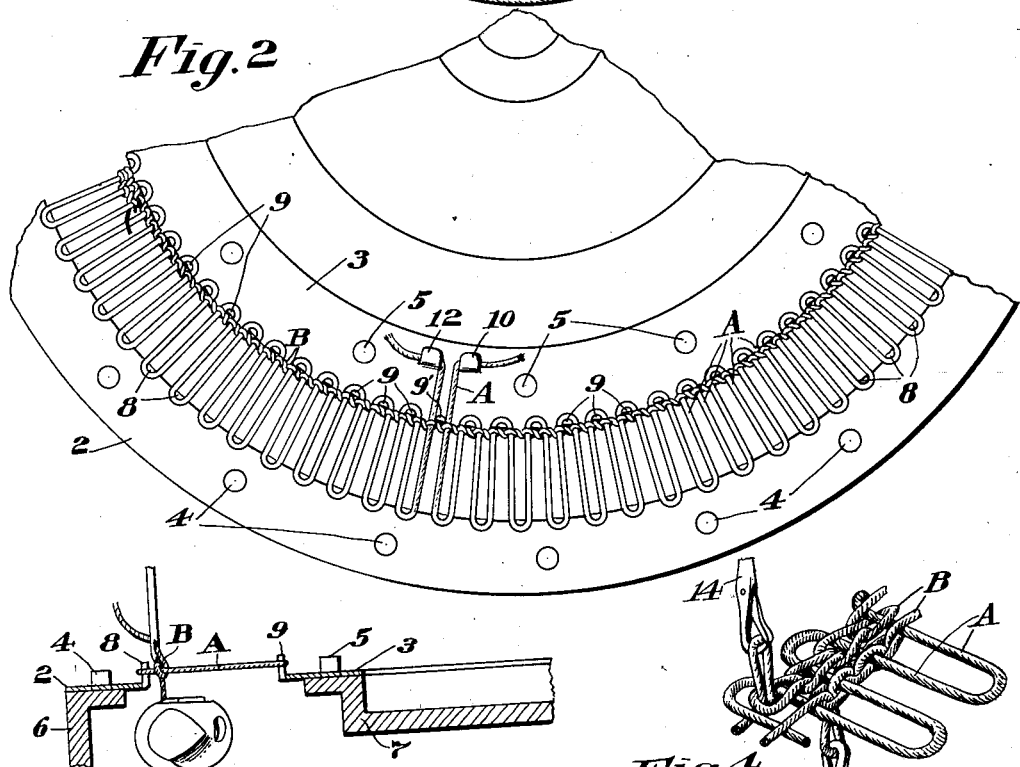
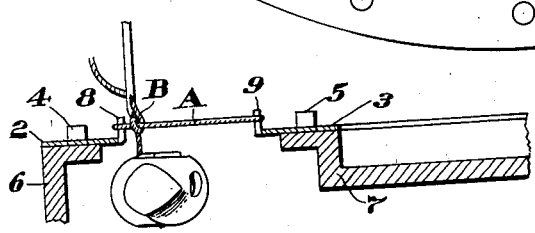
INVENTOR
Edwin E. Waite
BY
ATTORNEY.

Patented May 29, 1928.

1,671,944

UNITED STATES PATENT OFFICE.

EDWIN E. WAITE, OF FRAMINGHAM, MASSACHUSETTS, ASSIGNOR OF ONE-HALF TO MULTIBESTOS COMPANY, OF WALPOLE, MASSACHUSETTS, A CORPORATION OF MASSACHUSETTS.

ENDLESS FACING AND METHOD OF MANUFACTURING SAME.

Application filed June 10, 1926. Serial No. 115,131.

This invention relates to endless facings, such as the friction facings commonly used in clutches, although it is contemplated that the invention may also find application in the manufacture of other facings, particularly gaskets.

As is well understood by those skilled in the clutch art, it is a common practice to interpose a facing or lining of asbestos, or some other friction material, between the driving and driven elements of a clutch. In a disk clutch, for example, each disk of one set usually has an asbestos facing riveted to one or both sides thereof. The better class of clutch facings or clutch rings commonly used heretofore have been woven from asbestos yarn, the yarn usually being reinforced with one or more small wires. Two common types of clutch rings of this type are on the market, one made by curving a narrow piece of asbestos fabric into the form of a flat ring, while the other is made by weaving a fabric of a width at least equal to the diameter of the ring and then cutting rings out of this wide fabric. The first method produces a ring which is objectionable in having a break or joint in it, but it has the advantage of having a selvage at both its inner and outer edges. The second method produces a ring which has the advantage of being endless, or in other words is devoid of a joint, lap or splice, but is extremely expensive to manufacture and the fabric is "raw or cut at both its inner and outer edges.

The present invention aims especially to devise a clutch ring which will have the advantage of both types of rings above described while avoiding their objectionable features. The invention also involves a novel method of manufacturing endless facings of the types above referred to.

The nature of the invention will be readily understood from the following description when read in connection with the accompanying drawings, and the novel features will be particularly pointed out in the appended claims.

In the drawings,

Figure 1 is a plan view of a clutch ring or facing constructed in accordance with this invention;

Fig. 2 is a plan view showing certain steps in the process of manufacturing the ring shown in Fig. 1;

Fig. 3 is a vertical cross-sectional view through a part of the apparatus shown in Fig. 2; and Fig. 4 is an angular view of a small portion of fabric made in accordance with this invention, the strands of yarn composing the fabric being shown widely separated or spread apart for the purpose of more clearly illustrating the construction.

Briefly stated, the clutch ring shown consists of warp and weft strands interlocked with each other, the warp strands being stitched into the weft.

According to the preferred method of manufacture, the weft is first laid in a zig-zag fashion across an annular path of approximately the dimensions of the ring to be made, thus forming a skeleton of a clutch ring. The warp then is stitched into this skeleton in circumferential turns lying side by side until the skeleton is substantially filled.

Figs. 2 and 3 shows the more important parts of an apparatus which may conveniently be used in practicing the present process. This apparatus comprises outer and inner flat rings 2 and 3, respectively, removably supported on pins 4 and 5 which project upwardly from annular supports 6 and 7, respectively, these supports being mounted to rotate around a common axis. The outer ring 2 is provided on its inner edge with upstanding lugs or fingers 8, while the inner ring 3 is provided on its outer edge with similar lugs or fingers 9, the fingers 8 being offset or staggered radially with reference to the fingers 9. The inner ring 3 also is provided with a spring finger 10 under which one end of the weft A can be anchored. This weft next is laid backward and forward across the space between the edges of the rings 2 and 3 and around the lugs 8 and 9 until the lugs are all filled and a complete skeleton of a clutch ring has been formed. The trailing end of the weft thread A may be locked under a spring finger 12 like the finger 10, or the two ends may be tied together around the lug 9'. This completes the laying of the weft. This weft may consist of any suitable material, asbestos yarn or wire being used. It will be observed that when the laying operation has been completed the weft is arranged in a plurality of strands each lying substantially radially of the annular skeleton which has been formed.

The warp preferably, although not necessarily, consists of asbestos yarn, and it is stitched into the weft by hand or in any convenient manner, preferably with the aid of a suitable sewing machine. This machine may be either of the chain stitch or lock stitch type. Whichever machine is used the stitching operation is preferably started closely adjacent to the outer edge of the ring 3 and proceeds circumferentially around the ring to the point of beginning. The machine is then stepped over by a distance approximately equal to the diameter of the yarn and another turn is stitched in, these operations being repeated until the entire space between the rings 2 and 3 has been filled with warp. The thread ends are then tied, the rings 2 and 3 are lifted off their supports 6 and 7, and the lugs 8 and 9 are released from the loops of weft which they hold.

The completed clutch ring is shown at C in Fig. 1. It will be observed that the strands of weft A extend through the loops of the stitches of the warp B and that the weft binds the turns or convolutions of the warp securely together. A clutch ring thus is made which is endless in the strictest sense of that term, being devoid of any break, lap, or splice.

If a sewing machine of the lock stitch type is used to stitch in the warp, the same thickness of yarn will be presented at each side of the weft. If a chain stitch is used, as shown for example in Fig. 4, there will be two strands of warp on one side of the weft for each strand on the opposite side. In order to distribute the warp strands evenly on the opposite sides of the weft, it is preferable to use two sewing machines, one operating upside down and preferably behind the other, so as to stitch two warp yarns into the weft simultaneously. This same expedient can also be adopted in using lock stitch sewing machines in order to increase the rate of production. In fact a gang of sewing machines may, if desired, be arranged to stitch in the warp simultaneously. In using two chain stitch mechanisms, as shown in Fig. 4, it is preferable to have the needles 14 and 15 arranged with their latches pointing inwardly or away from the selvage edges of the fabric so as to permit stitching closer to the loops of the weft A than otherwise would be possible.

After the clutch ring has been completed it preferably is impregnated with a material which binds the fibres of the ring together and gives it approximately the desired coefficient of friction. For this purpose the binders ordinarily used in impregnating clutch facings made by the prior processes above described may be used. A great variety of such binders are used in this art so that no specific composition need be given. Some of these binders are of a rubber nature while others depend chiefly on a drying oil or asphaltic substances, or a mixture of the two, to produce the binding action. After being impregnated with a suitable binder the clutch ring usually is baked to cure the binder, and the ring may be pressed to bring it down to the desired thickness.

This ring is superior to the endless rings made by the prior processes above described in that it has a selvage at each edge, it is absolutely endless, is of uniform thickness throughout, and it has superior mechanical strength. It may even be used as a floating ring between the driving and driven disks of a disk clutch, which has not been practical with prior forms of woven rings.

While I have herein shown and described the best embodiment of my invention that I have so far devised, and the process at present preferred, it will be understood that the invention may be embodied in other forms without departing from the spirit or scope thereof, and that considerable variation in procedure is permissible within the limits of the novel process provided by this invention.

The invention is equally applicable also to the manufacture of clutch facings of a more or less conical form which are used in some kinds of clutches.

Having thus described my invention, what I desire to claim as new is:

1. An endless friction facing comprising warp and weft strands interlocked with each other and forming an endless ring devoid of a break or splice, said ring having two selvage edges, one of which is of greater length than the other.

2. An endless friction facing comprising warp and weft strands interlocked with each other and forming a substantially flat endless ring devoid of a break or splice, said ring having two selvage edges, and said warp strands extending circumferentially of the ring while the weft extends across the ring and binds the warp strands together.

3. An endless friction facing comprising warp and weft strands interlocked with each other and forming a substantially flat endless ring devoid of a break or splice, said ring having two selvage edges, and the warp extending around the ring in a series of continuous convolutions.

4. An endless friction facing comprising warp and weft strands interlocked with each other and forming a substantially flat endless ring devoid of a break or splice, said ring having two selvage edges, and the weft extending across the ring from one edge thereof to the other and the warp being stitched into the weft.

5. An endless clutch facing devoid of a break or splice and comprising independent sets of warp and weft strands interlocked with each other, said facing having two selvage edges, and one set of said strands being arranged to form stitches through the loops of which stitches the other set of strands extend.

6. An endless clutch facing comprising a warp extending circumferentially a plurality of times around the ring and arranged in the form of a series of stitches, and a weft extending through said stitches and binding the convolutions of the warp together, said ring having two selvage edges.

7. An endless clutch facing comprising a warp consisting of asbestos yarn, said warp extending circumferentially around the belt in a plurality of turns lying side by side, and a weft disposed transversely of the warp, the warp yarn being arranged to form stitches, and the weft extending through the loops of said stitches and binding the turns of warp together.

8. That improvement in the art of making endless friction facings having warp and weft strands which consists in arranging one set of said strands in the form of a flat annulus and then stitching the other set of strands into the set so laid.

9. That improvement in the art of making endless friction facings having warp and weft strands which consists in laying the weft backward and forward across an annular path and thereby making a skeleton of a ring, and then stitching the warp circumferentially into said skeleton in a series of turns of different diameters lying side by side.

10. That improvement in the art of making clutch facings having warp and weft strands which consists in laying the weft backward and forward across an annular path and thereby making a skeleton of a clutch ring, and then stitching asbestos yarn into said skeleton until the skeleton is substantially filled.

11. An endless friction facing comprising warp and weft strands interlocked with each other and forming a substantially flat endless ring devoid of a break or splice, the weft extending across the ring from one edge thereof to the other and the warp being chain stitched into the weft in a series of turns lying side by side, the stitches in adjacent turns being drawn toward opposite faces of the ring.

12. That improvement in the art of making endless friction facings having warp and weft strands, which consists in arranging the weft in the form of a flat annulus and thereby making a skeleton of a ring, then chain stitching the warp circumferentially into said skeleton in a series of turns of different diameters lying side by side, and drawing the stitches in adjacent turns toward opposite faces of the annulus.

13. That improvement in the art of making endless friction facings which consists in providing a clutch ring skeleton of annular form, said skeleton having connected radially extending lengths of material separated by slots, then stitching yarn into said skeleton in a series of circumferential turns of different diameters lying side by side, and during said stitching operation, forming the stitches around said lengths of material.

14. An endless clutch facing comprising a clutch ring skeleton of annular form having radially extending lengths of material separated from each other by narrow spaces, and a warp extending circumferentially a plurality of times around the ring and arranged in the form of stitches with said lengths extending through the loops of said stitches.

EDWIN E. WAITE.